US008881169B2

(12) United States Patent
Abe et al.

(10) Patent No.: US 8,881,169 B2
(45) Date of Patent: Nov. 4, 2014

(54) INFORMATION PROCESSING APPARATUS FOR MONITORING EVENT DELIVERY FROM PLURALITY OF MONITORING THREADS

(75) Inventors: Yasuhiko Abe, Saitama-Ken (JP); Masahiko Nagumo, Tokyo (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 1088 days.

(21) Appl. No.: 12/532,017

(22) PCT Filed: Jan. 21, 2008

(86) PCT No.: PCT/JP2008/050718
§ 371 (c)(1),
(2), (4) Date: Sep. 18, 2009

(87) PCT Pub. No.: WO2008/114525
PCT Pub. Date: Sep. 25, 2008

(65) Prior Publication Data
US 2010/0107175 A1    Apr. 29, 2010

(30) Foreign Application Priority Data

Mar. 20, 2007 (JP) .................................. 2007-73305

(51) Int. Cl.
*G06F 9/46* (2006.01)
*G06F 11/00* (2006.01)
*G06F 11/07* (2006.01)
*G06F 11/34* (2006.01)

(52) U.S. Cl.
CPC ........ *G06F 11/3404* (2013.01); *G06F 11/0742* (2013.01); *G06F 11/0757* (2013.01); *G06F 11/0715* (2013.01)
USPC ........... 718/107; 718/103; 718/102; 718/100; 714/15

(58) Field of Classification Search
None
See application file for complete search history.

(56) References Cited

U.S. PATENT DOCUMENTS 6,085,215 A * 7/2000 Ramakrishnan et al. ..... 718/102
6,910,212 B2 * 6/2005 Brenner et al. ............... 718/104

(Continued)

FOREIGN PATENT DOCUMENTS

JP    5-265807 A    10/1993
JP    2000-10800 A    1/2000

(Continued)

OTHER PUBLICATIONS

Notification Concerning Transmittal of International Preliminary Report on Patentability, Chapter I of the Patent Cooperation Treaty and PCT Written Opinion of the International Searching Authority for PCT/JP2008/050718, 7 sheets.

(Continued)

*Primary Examiner* — Meng An
*Assistant Examiner* — Bing Zhao
(74) *Attorney, Agent, or Firm* — Maschoff Brennan

(57) ABSTRACT

In a cellular phone applicable to an information processing apparatus according to the present invention, a CPU of a main control unit executes monitor threads 1 to 3, monitors groups including a plurality of threads set with priority by executing a keep-alive operation to a plurality of monitor threads that monitor operations of threads in the groups, determines whether there is a monitor thread without a response to the keep-alive operation based on responses from the plurality of monitor threads, and terminates delivery of events to the groups with priority higher than the group monitored by the monitor thread without a response to the keep-alive operation if it is determined that there is a monitor thread without a response to the keep-alive operation.

10 Claims, 10 Drawing Sheets

(56) References Cited

U.S. PATENT DOCUMENTS

| | | | |
|---|---|---|---|
| 7,480,827 B2 * | 1/2009 | Callaway et al. | 714/6.3 |
| 7,565,652 B2 | 7/2009 | Janssen et al. | |
| 8,397,237 B2 * | 3/2013 | Rumelhart et al. | 718/104 |
| 2005/0235136 A1 * | 10/2005 | Barsotti et al. | 713/1 |
| 2006/0143616 A1 | 6/2006 | Koike et al. | |

FOREIGN PATENT DOCUMENTS

| | | |
|---|---|---|
| JP | 2001-306338 A | 11/2001 |
| JP | 2005-516303 A | 6/2005 |
| JP | 2006-172229 A | 6/2006 |
| JP | 2006-185303 A | 7/2006 |

OTHER PUBLICATIONS

Office Action dated Jul. 10, 2012 issued with respect to the corresponding Japanese Patent Application No. 2009-505092.

* cited by examiner

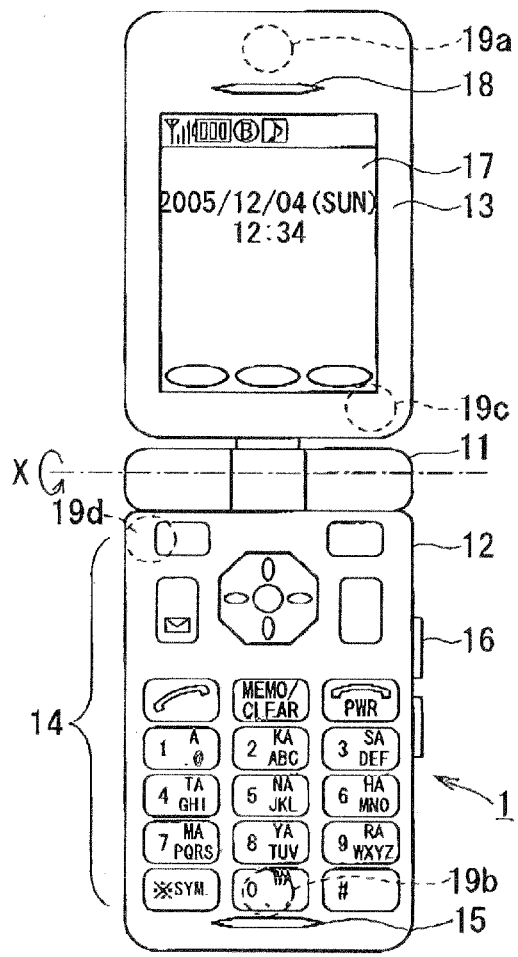
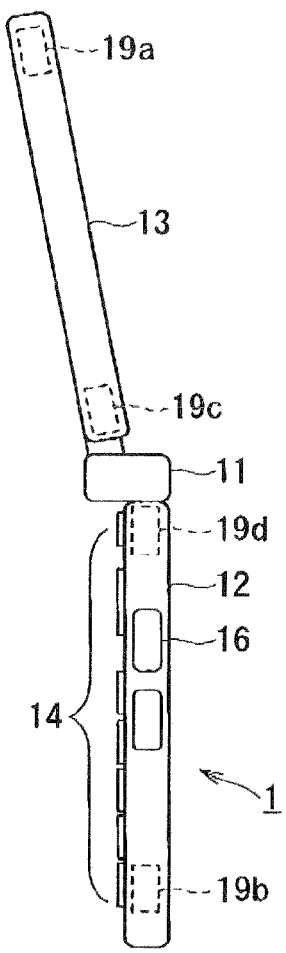
FIG. 1A  FIG. 1B
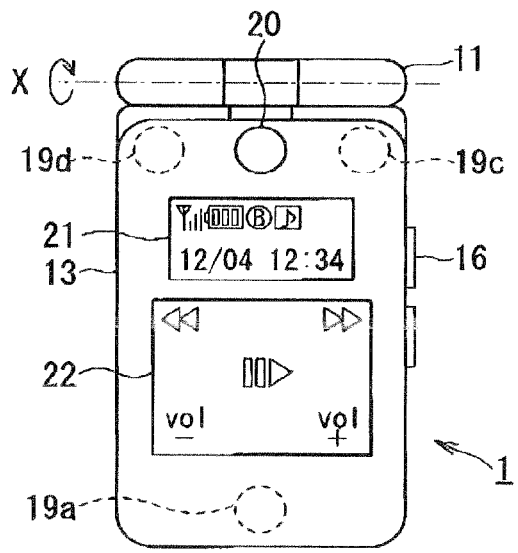
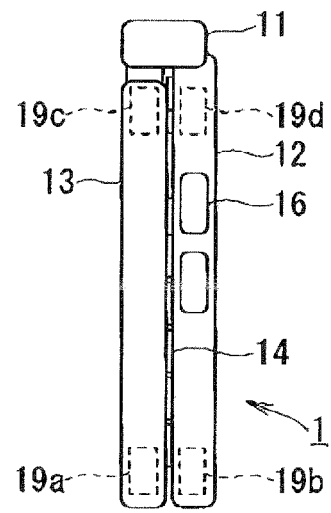
FIG. 2A  FIG. 2B

INFORMATION PROCESSING APPARATUS FOR MONITORING EVENT DELIVERY FROM PLURALITY OF MONITORING THREADS

This application is a U.S. National Phase Application under 35 USC 371 of International Application PCT/JP2008/050718 filed Jan. 21, 2008.

TECHNICAL FIELD

The present invention relates to an information processing apparatus, and particularly, to an information processing apparatus capable of executing a multithread process in which a plurality of processes of threads are executed in parallel.

BACKGROUND ART

In recent years, a cellular phone as an information processing apparatus is equipped with not only a simple communication function through telephone calls, but also with various functions, such as an address book function, a mail function through a network such as a base station and the Internet, and a browser function that allows browsing Web pages and the like.

Accordingly, a multithread system is proposed not only in, for example, a personal computer, but also in a cellular phone. The multithread system includes a TSS (Time Sharing System) control function in an OS (Operating System) and concurrently executes processes of a plurality of threads within the same process, while sharing resources such as a control memory space and an I/O space (see, for example, Patent Document 1).

According to the technique proposed in Patent Document 1, a process of a call processing event can be executed by using a CPU to the fullest extent without depending on the implementation of a TSS scheduler of an OS.

Patent Document 1: Japanese Patent Laid-Open No. 2006-185303

However, in an OS environment not equipped with a round-robin function or a TSS control function, generated events are generally processed according to the priority of the generated event-driven threads. If some threads occupy the resources of the CPU, there is a situation in which processes of other threads are not executed.

More specifically, if processes between threads with high priority are consecutively executed, a plurality of threads with high priority occupy the resources of the CPU, and the resources of the CPU are not provided to the threads with low priority. As a result, there is a situation in which processes of the threads with low priority are not executed. Therefore, there was a problem that the processes of the threads with low priority were accumulated, and the system collapsed.

The technique proposed in Patent Document 1 cannot solve such a problem.

DISCLOSURE OF THE INVENTION

The present invention has been made in view of the foregoing circumstances, and an object of the present invention is to provide an information processing apparatus that can efficiently control an application program group established on an OS without using a round-robin function or a TSS control function.

To solve the problem, an information processing apparatus of the present invention comprising: a monitoring unit configured to monitor groups including a plurality of threads set with priority by executing a keep-alive operation to a plurality of monitor threads which monitor operations of threads in the groups; a first determining unit configured to determine whether there is a monitor thread without a response to the keep-alive operation, based on responses from the plurality of monitor threads; and a first terminating unit configured to terminate delivery of events to the groups with priority higher than the group monitored by the monitor thread without a response to the keep-alive operation if the first determining unit determines that there is a monitor thread without a response to the keep-alive operation.

To solve the problem, an information processing apparatus of the present invention comprising: a monitoring unit configured to monitor groups including a plurality of threads set with priority by executing a keep-alive operation to a plurality of monitor threads which monitor operations of threads in the groups; a first determining unit configured to determine whether there is a monitor thread without a response to the keep-alive operation, based on responses from the plurality of monitor threads; and a priority changing unit configured to change the priority of at least one thread included in the group monitored by the monitor thread without a response to the keep-alive operation or in the groups with priority higher than the group if the first determining unit determines that there is a monitor thread without a response to the keep-alive operation.

In the information processing apparatus of the present invention, groups including a plurality of threads set with priority are monitored by executing a keep-alive operation to a plurality of monitor threads that monitor operations of threads in the groups, whether there is a monitor thread without a response to the keep-alive operation is determined based on responses from the plurality of monitor threads, and the delivery of events to the groups with priority higher than the group monitored by the monitor thread without a response to the keep-alive operation is terminated if it is determined that there is a monitor thread without a response to the keep-alive operation.

In the information processing apparatus of the present invention, groups including a plurality of threads set with priority is monitored by executing a keep-alive operation to a plurality of monitor threads that monitor operations of threads in the groups, whether there is a monitor thread without a response to the keep-alive operation is determined based on responses from the plurality of monitor threads, and the priority of at least one thread included in the group monitored by the monitor thread without a response to the keep-alive operation or in the groups with priority higher than the group is changed if it is determined that there is a monitor thread without a response to the keep-alive operation.

According to the present invention, an application program group established on an OS not equipped with a round-robin function or a TSS control function can be efficiently controlled.

BRIEF DESCRIPTION OF THE DRAWINGS

FIG. 1 is an external view showing a configuration of the appearance of a cellular phone applicable to an information processing apparatus according to the present invention;

FIG. 2 is an external view showing another configuration of the appearance of the cellular phone applicable to the information processing apparatus according to the present invention;

BEST MODE FOR CARRYING OUT THE INVENTION

Figure 3:
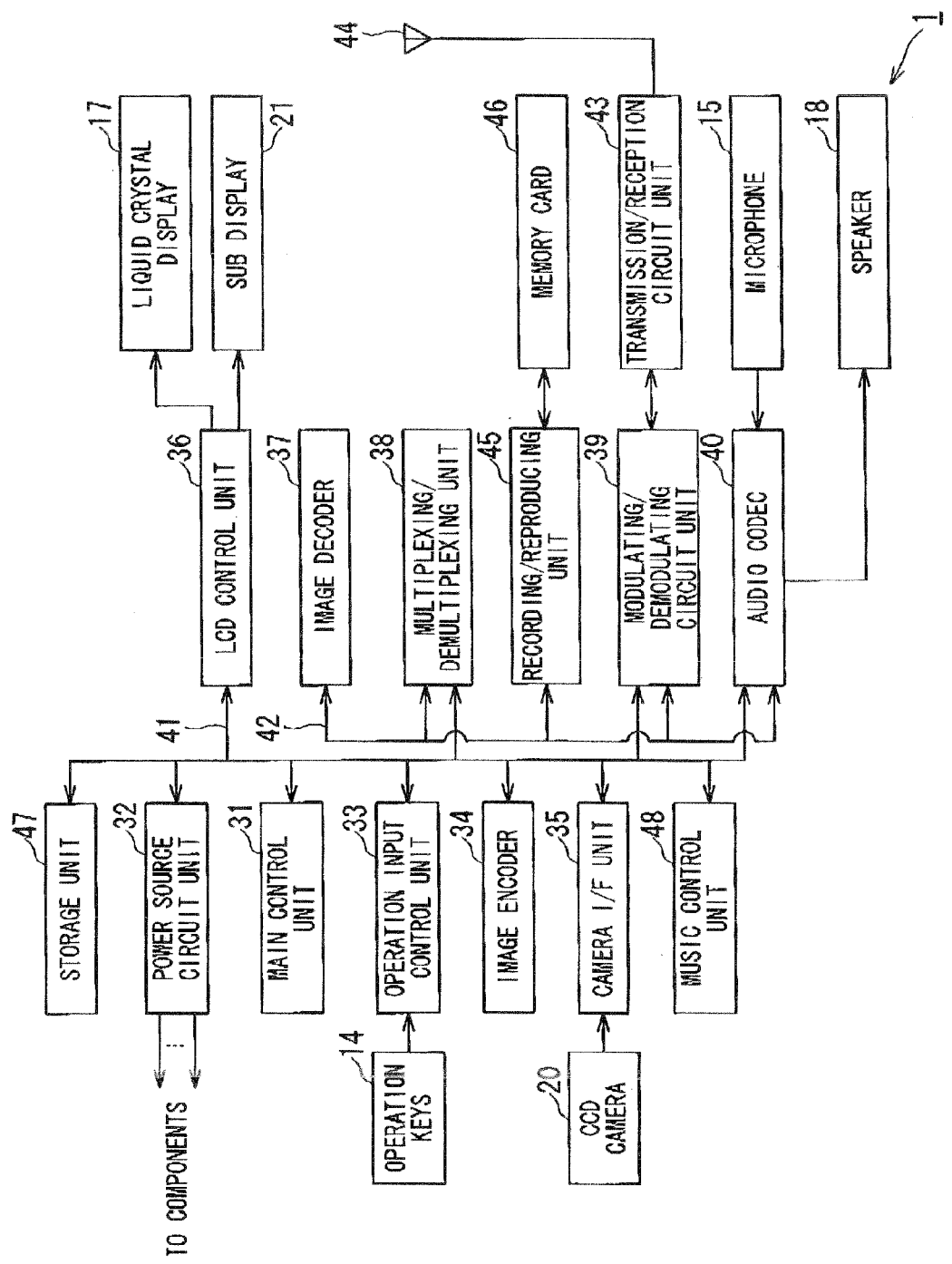
FIG. 3 is a block diagram showing a configuration inside the cellular phone applicable to the information processing apparatus according to the present invention.

Hereinafter, an embodiment of the present invention will be described with reference to the drawings. FIG. 1 illustrates a configuration of the appearance of a cellular phone 1 applicable as an information processing apparatus according to the present invention. FIG. 1(A) illustrates a configuration of the appearance as seen from the front if the cellular phone 1 is opened 180 degrees, and FIG. 1 (B) illustrates a configuration of the appearance as seen from the side if the cellular phone 1 is opened.

As shown in FIGS. 1(A) and 1(B), the cellular phone 1 includes a first casing 12 and a second casing 13, which form a hinge connection across a hinge portion 11 at the center and which are foldable in an arrow X direction through the hinge poi Lion 11. An antenna for transmission and reception (antenna 44 of FIG. 3 described below) is arranged at a predetermined location inside the cellular phone 1, and radio waves are transmitted and received to and from a base station through a built-in antenna.

Operation keys 14, such as numeric keys "0" to "9", a call key, a redial key, a call-ending/power key, a clear key, and an email key, are arranged on the surface of the first casing 12, and various instructions can be inputted using the operation keys 14.

Arrow keys and a confirmation key are arranged as operation keys 14 at the upper part of the first casing 12, and a cursor applied by the user operating the arrow keys in the vertical and horizontal directions can be moved in the vertical and horizontal directions. Specifically, various operations are executed, such as a scroll operation of a telephone directory list or email displayed on a liquid crystal display 17 arranged on the second casing 13, a page turning operation of simple homepages, and an image transmission operation.

Various functions can also be confirmed by pressing the confirmation key. For example, on the first casing 12, if a desired phone number is selected from a plurality of phone numbers in the telephone directory list displayed on the liquid crystal display 17 in accordance with the operation of the arrow keys by the user, and the confirmation key is pressed toward the inside the first casing 12, the selected phone number is confirmed, and a call process is executed for the phone number.

An email key is further arranged on the left of the arrow keys and the confirmation key on the first casing 12, and when the email key is pressed toward the inside the first casing 12, a mail transmission and reception function can be invoked. A browser key is arranged on the right of the arrow keys and the confirmation key, and when the browser key is pressed toward the inside the first casing 12, data of Web pages can be browsed. The email key and the browser key arranged on the left and right of the arrow keys and the confirmation key can have various functions, such as "Yes" and "No", on the screen displayed on the liquid crystal display 17. Therefore, the email key and the browser key are called a soft 1 key and a soft 2 key, respectively.

A microphone 15 is also arranged at the lower part of the operation keys 14 on the first casing 12, and the microphone 15 collects the voice of the user during a telephone call. A side key 16 for operating the cellular phone 1 is also arranged on the first casing 12

A battery pack is inserted on the back side of the first casing 12, and when the call-ending/power key is turned on, the battery pack supplies power to the circuit units, which are then activated into an operable state.

Meanwhile, the liquid crystal display 17 (main display) is arranged at the front of the second casing 13, and a reception state of radio waves, remaining battery power, counter part names and phone numbers registered as a telephone directory, a transmission history, as well as the content of email, simple homepages, images photographed by a CCD (Charge Coupled Device) camera (CCD camera 20 of FIG. 2 described below), contents received by an external contents server (not shown), and contents stored in a memory card (memory card 46 of FIG. 3 described below) can be displayed.

A speaker (receiver) 18 is arranged at a predetermined location of the upper part of the liquid crystal display 17, and the speaker 18 allows the user to make a voice call.

FIG. 2 illustrates another configuration of the appearance of the cellular phone 1 applicable as the information processing apparatus according to the present invention. The state of the cellular phone 1 of FIG. 2 is in a state in which the cellular phone 1 in the state of FIG. 1 is rotated in the arrow X direction. FIG. 2(A) illustrates a configuration of the appearance as seen from the front if the cellular phone 1 is closed, and FIG. 2(B) illustrates a configuration of the appearance as seen from the side if the cellular phone 1 is closed.

The CCD camera 20 is arranged at the upper part of the second casing 13, and the CCD camera 20 can photograph a desired photographic subject. A sub display 21 is arranged at the lower part of the CCD camera 20, and an antenna pict indicating the level of the current sensitivity of the antenna, a battery pict indicating the current remaining battery power of the cellular phone 1, the current time, and the like are displayed.

An electrostatic touch pad 23 is further arranged at the lower part of the sub display 21. Although the electrostatic touch pad 22 is one piece of touch pad by appearance, sensors not shown are arranged at a plurality of locations. If the user touches near a sensor, the sensor detects the touch. A rewind function, a fast-forward function, a volume down operation, a volume up operation, a reproducing operation, a pause operation, or the like is executed in accordance with the detection by the sensor.

FIG. 3 illustrates a configuration inside the cellular phone 1 applicable as the information processing apparatus according to the present invention. As shown in FIG. 3, the cellular phone 1 is constituted by a power source circuit unit 32, an operation input control unit 33, an image encoder 34, a camera interface unit 35, an LCD (Liquid Crystal Display) control unit 36, a multiplexing/demultiplexing unit 38, a modulating/ demodulating circuit unit 39, an audio codec 40, a storage unit 47, and a music control unit 48, which are connected to a main control unit 31 that comprehensively controls the components of the first casing 12 and the second casing 13, and which are connected to each other through a main bus 41. The image encoder 34, an image decoder 37, the multiplexing/demultiplexing unit 38, the modulating/demodulating circuit unit 39, the audio codec 40, and a recording/reproducing unit 45 are connected to each other through a synchronization bus 42.

The main control unit 31 has a CPU (Central Processing Unit), a ROM (Read Only Memory), and a RAM (Random Access Memory). The CPU executes various processes according to programs stored in the ROM or according to various application programs that are loaded from the storage unit 47 into the RAM and that include an operating system (OS) and generates and supplies various control signals to the components to comprehensively control the cellular phone 1. The RAM stores, on an as needed basis, data and the like necessary for the CPU to execute various processes. The main control unit 31 includes a timer that accurately measures the current date and time.

In the cellular phone 1, based on the control of the main control unit 31, the audio codec 40 converts and compresses an audio signal collected by the microphone 15 during a voice call mode into a digital audio signal, the modulating/demodulating circuit unit 39 applies a spread spectrum process to the digital audio signal, a transmission/reception circuit unit 43 applies a digital/analog conversion process and a frequency conversion process to the digital audio signal, and the digital audio signal is then transmitted through the antenna 44.

The cellular phone 1 amplifies the received signal received by the antenna 44 during the voice call mode and applies a frequency conversion process and an analog/digital conversion process to the received signal. The received signal is subjected to an inversion spread spectrum process by the modulating/demodulating circuit unit 39, expanded by the audio codec 40, and converted to an analog audio signal. The converted analog audio signal is outputted through the speaker 18.

If transmitting an image signal during a data communication mode, the cellular phone 1 supplies an image signal photographed by the CCD camera 20 to the image encoder 34 through the camera interface unit 35.

The image encoder 34 uses a predetermined encoding system, such as MPEG (Moving Picture Experts Group) 4, to compress and encode an image signal supplied from the CCD camera 20 to convert the image signal into an encoded image signal and then transmits the converted encoded image signal to the multiplexing/demultiplexing unit 38. At the same time, the cellular phone 1 transmits the voice collected by the microphone 15 during photographing by the CCD camera 20 to the multiplexing/demultiplexing unit 38 through the audio codec 40, the voice being a digital audio signal.

The multiplexing/demultiplexing unit 38 uses a predetermined method to multiplex the encoded image signal supplied from the image encoder 34 and the audio signal supplied from the audio codec 40, the modulating/demodulating circuit unit 39 applies a spread spectrum process to the obtained multiplexed signal, the transmission/reception circuit unit 43 applies a digital/analog conversion process and a frequency conversion process to the signal, and the signal is then transmitted through the antenna 44. Whereas, the cellular phone 1 can receive data of a Web page during the data communication mode.

When receiving, for example, data of a moving image file linked to a Web page or the like during the data communication mode, the modulating/demodulating circuit unit 39 in the cellular phone 1 applies an inverse spread spectrum process to the received signal received from a base station through the antenna 44, and the cellular phone 1 transmits the obtained multiplexed signal to the multiplexing/demultiplexing unit 38.

The multiplexing/demultiplexing unit 38 demultiplexes and divides the multiplexed signal into an encoded image signal and an audio signal, supplies the encoded images signal to the image decoder 37 through the synchronization bus 42, and supplies the audio signal to the audio codec 40. The image decoder 37 decodes the encoded image signal by a decoding system corresponding to a predetermined encoding system such as MPEG4 to generate a reproduction moving image signal and supplies the generated reproduction moving image signal to the liquid crystal display 17 through the LCD control unit 36. In this way, moving image data included in a moving image file linked to a Web page or the like is displayed.

At the same time, the audio codec 40 converts the audio signal to an analog audio signal and then supplies the signal to the speaker 18. In this way, the audio signal included in a moving image file linked to a Web page is reproduced.

The storage unit 47 is formed of, a flash memory element as a nonvolatile memory capable of electronic rewriting and deletion and an HDD (Hard Disk Drive), and stores various application programs and various data groups executed by the CPU of the main control unit 31.

The music control unit 48 controls the execution of a reproducing operation, a pause operation, a rewind function, a fast-forward function, a volume down operation, a volume up operation, and the like of audio data stored in the storage unit 47.

In an OS environment not equipped with a round-robin function or a TSS control function, generated events are generally processed according to the priority of the generated event-driven threads. Therefore, if some threads occupy the resources of the CPU of the main control unit 31, there is a situation in which processes of other threads are not executed.

More specifically, if processes between threads with high priority are consecutively executed, a plurality of threads with high priority occupy the resources of the CPU of the main control unit 31, and the resources of the CPU of the main control unit 31 are not provided to the threads with low priority. As a result, there is a situation in which processes of the threads with low priority are not executed. Therefore, the processes of the threads with low priority are accumulated, and the system collapses.

Figure 4:
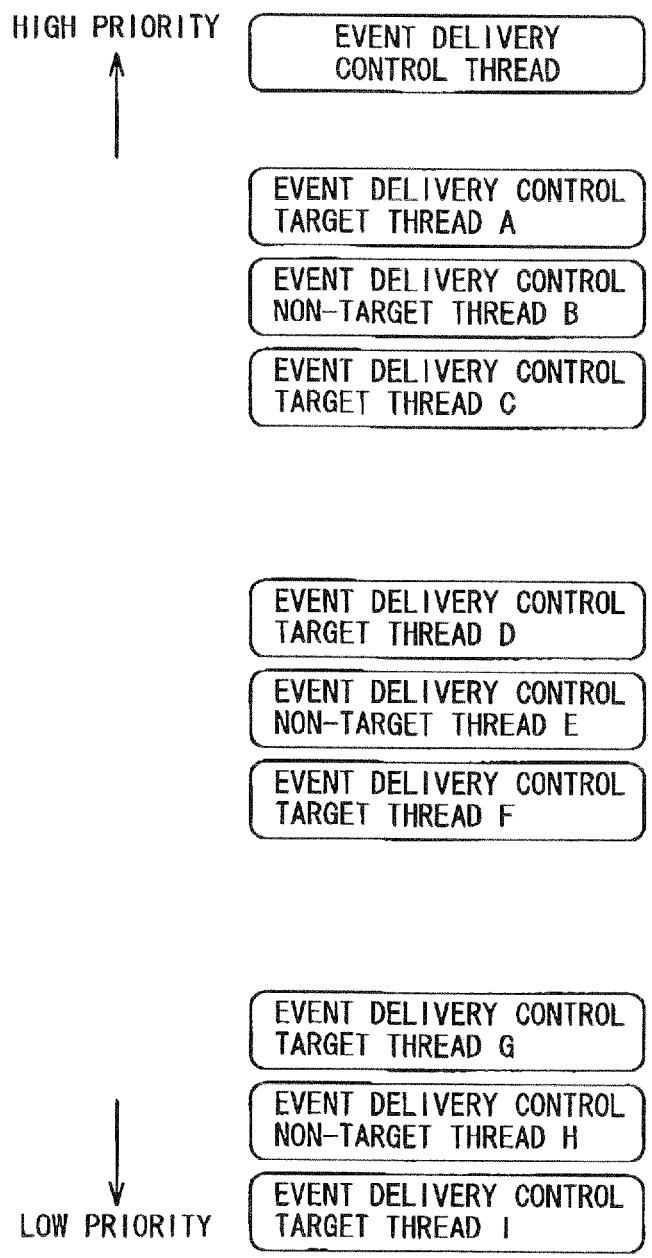
FIG. 4 is an explanatory view for explaining a collapse of a system caused by the accumulation of processes of threads with low priority.

Specifically, as shown for example in FIG. 4, a case will be simulated in which, when an event delivery control thread controls part of the threads, thread A, thread B, thread C, in the order of descending priority. The thread C is a thread for using a soft timer to periodically acquire time from a thread H (thread controlled by the event delivery control thread), a thread D is a thread for accepting an input of a key (thread controlled by the event delivery control thread), a thread F is a thread for updating a display screen and executing processes associated with other key events (thread controlled by the event delivery control thread), and on the other hand, a thread E is a thread for reading out sound data managed by the thread H to make a sound (thread not controlled by the event delivery control thread). The thread F is a thread capable of notifying a sounding request to the thread E to make a key touch sound associated with an input of a key and making a drawing without waiting for a response after the sound making request. The thread E is a thread for receiving the key sound making request to read out sound data of a key touch sound managed by the thread H.

In the system of such an application program, if the user quickly and consecutively presses the key inputs, an interrupt of key input first occurs due to the pressing of keys by the user, and the thread D supplies the generated key event to the thread F. Secondly, the thread F notifies a sounding request for making a key touch sound to the thread E, and without waiting for the response of the sounding request, processes the pressed key event to rewrite the display screen corresponding to the event. Thirdly, when receiving the sounding request from the thread F, the thread E requests the thread H to read out sound data necessary to make a sound. Fourthly, receiving the reading request of sound data from the thread E, the thread H transmits the sound data to the thread E. Fifthly, the thread E controls the audio codec 40 and the speaker 18 to make a key touch sound.

However, if the user quickly and consecutively presses the key inputs for a long time, the key pressing by the user is performed earlier than the completion of the reading process by the thread E, which is the third process. Therefore, the thread H cannot operate due to the priority of the threads, and the fourth and fifth processes are not executed. Meanwhile, since the user consecutively presses the keys, the events of the threads D to F are executed. However, the notification process of the sounding request from the thread F to the thread E is not executed, and events are pooled in the system. As a result, the system collapses if the system resources are depleted. In other words, although the thread E does not make a key touch sound, only the thread F executes an updating process of the display screen.

Obviously, a process may be added in which the upper limit of events accepted in the thread E is determined in advance, and events accepted over the upper limit are abandoned. However, the resources of the CPU of the main control unit 31 are eventually occupied by the processes of the threads D to F. Furthermore, if the thread E is designed to execute the event abandon process, the screen transition and the sounding are deviated. Thus, although a case can be considered in which the upper limit of events accepted in the thread D is predetermined, that is inappropriate because it is the thread E of the sound control in which the resources of the CPU are actually occupied, and an event may be unnecessarily abandoned unless the relationship between the threads D and E are strictly figured out.

If the processes of the threads D to F continuously occupy the resources of the CPU, the thread C that executes a time changing process cannot acquire the time from the thread H, time changing process being asynchronous with the event of key input associated with the pressing by the user. Therefore, the time changing process is not executed, and the time is not updated. Such a case is inconvenient for the user even though the system is not collapsed. If the process is not the time changing process but is a process for synchronizing the threads with the network, the network synchronization gets off.

The same situation may also occur if the user performs browsing via, a base station not shown while using the music control unit 48 to listen to audio data.

Thus, a monitor thread for monitoring the thread operations is newly arranged, and the monitor thread monitors the thread operations every certain time (for example, five seconds or ten seconds), determines around which threads the resources of the CPU of the main control unit 31 are occupied, and temporarily terminates delivering events to the threads determined to occupy the resources of the CPU of the main control unit 31 if the resources of the CPU of the main control unit 31 are determined to be occupied.

However, as shown for example in FIG. 4, there are two types of threads generated by existing application programs: event delivery control target threads capable of controlling the delivery of events (for example, thread A, thread C, thread D, thread F, thread G, and thread I); and event delivery control non-target threads incapable of controlling the delivery of events (for example, thread B, thread E, and thread H). Therefore, around which threads the resources of the CPU of the main control unit 31 are occupied cannot be easily determined simply by monitoring the thread operations every certain time by the monitor thread.

Figure 5:
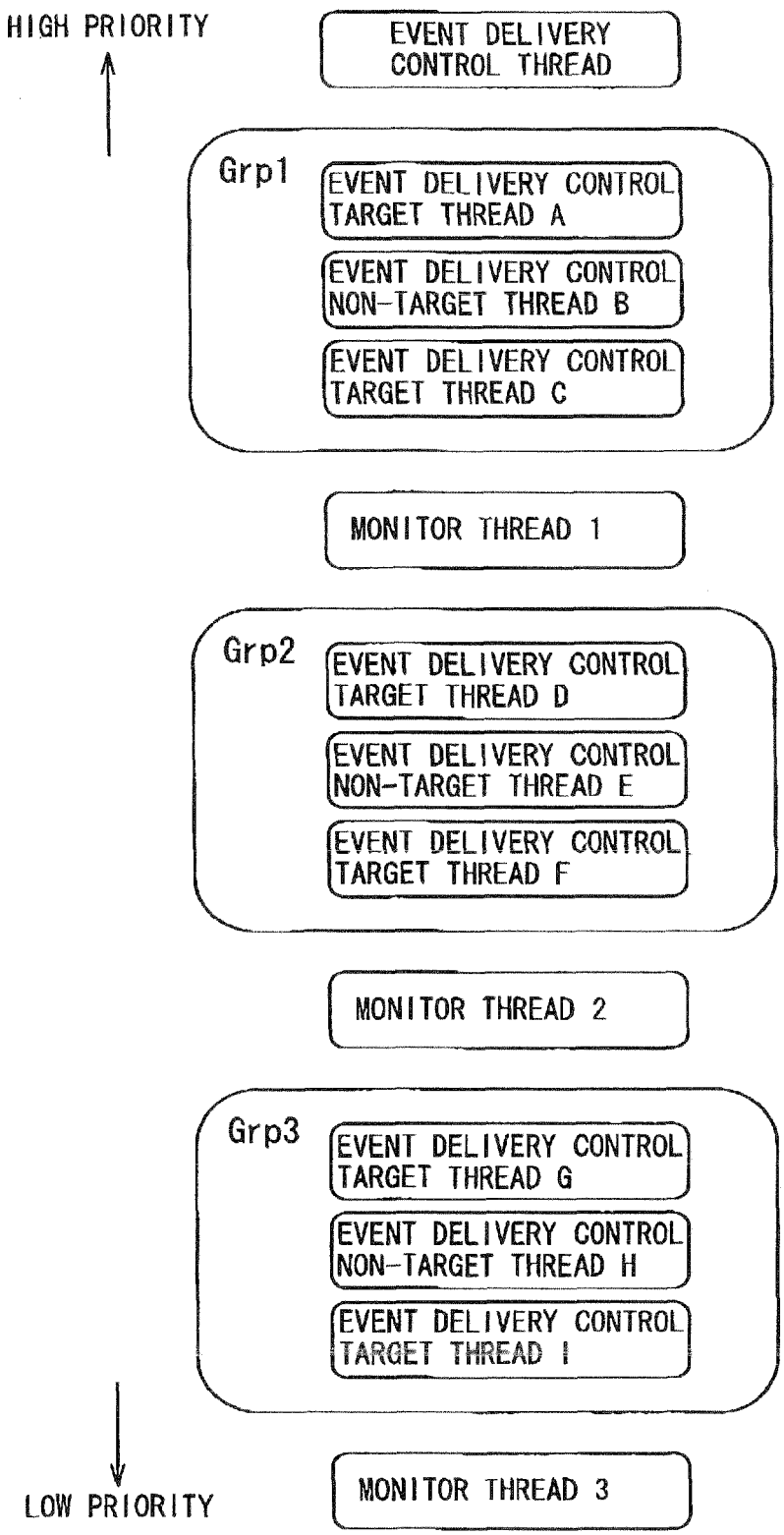
FIG. 5 is an explanatory view for explaining a method of grouping threads.

Thus, to easily determine around which threads the resources of the CPU of the main control unit 31 are occupied, a predetermined algorithm is used to group the existing threads into a plurality of groups in advance. For example, as shown in FIG. 5, threads for receiving asynchronous events to execute processes and threads in which the processes are generated by the threads, or event delivery control target threads and event delivery control non-target threads, are grouped into a plurality of groups (for example, groups 1 to 3).

To monitor the thread operations in the groups (for example, groups 1 to 3), monitor threads as threads for monitoring (for example, monitor threads 1 to 3) are arranged below the lowest priority threads of the groups, and the arranged monitor threads (for example, monitor threads 1 to 3) are used to monitor whether the thread operations are performed in each group while the threads return the resources of the CPU to the OS in each group, the resources of the CPU being allocated to the threads. For example, as the monitor threads 1 to 3 perform operations of returning responses to the event delivery control thread, the event delivery control thread monitors whether the thread operations are performed up to the monitor threads while the threads including the monitor threads return the resources of the CPU to the OS, the resources of the CPU being allocated to the threads.

If it is determined that thread operations are performed in a certain group without returning the resources of the CPU to the OS in at least one process of the thread, the resources of the CPU being allocated to the threads in a certain group (for example, if it is determined that there is a response from the monitor thread 1 but there is no response from the monitor thread 2, and the processes of the threads of the group 1 are performed while the threads of the group 1 return the resources of the CPU to the OS, the resources of the CPU being allocated to the threads of the group 1, but the processes of the threads of the group 2 are performed without returning the resources of the CPU to the OS in at least one process of the thread of the group 2, the resources of the CPU being allocated to the threads of the group 2), the delivery of events to the threads in the next higher (next higher priority) group of the group monitored by the monitor thread (for example, group 1 if there is a response from the monitor thread 1 and there is no response from the monitor thread 2) is terminated to pass the processes to lower groups.

In this way, an application program group established on an OS not equipped with the round-robin function or the TSS control function can be efficiently controlled. Hereinafter, an event delivery control process using the method will be described.

Figure 6:
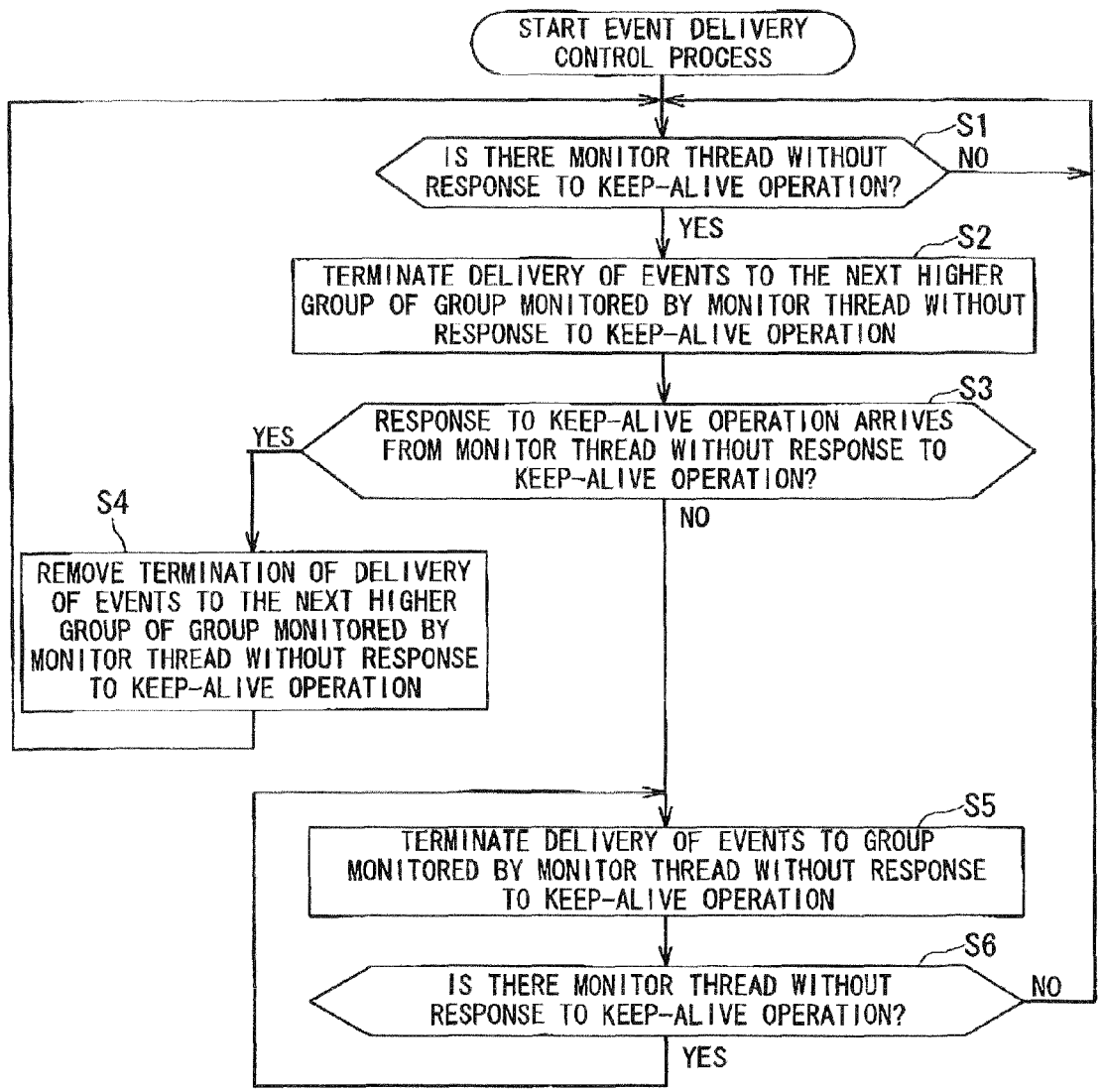
FIG. 6 is a flow chart for explaining an event delivery control process in the cellular phone of FIG. 3.

An event delivery control process in the cellular phone 1 of FIG. 3 will be described with reference to a flow chart of FIG. 6. A keep-alive storage process is executed in parallel with the event delivery control process. Specifically, the threads delivered with events from the event delivery control thread receive communications from other threads from the event delivery control thread. At this point, if events are periodically delivered to the threads as delivery control targets in the event delivery control, an event related to the keep-alive is set (stored) at the top of an event queue from the event delivery control thread. Such a process is defined as a "keep-alive storage process (keep-alive operation)".

If the event delivery control thread is designed to provide a process of extracting an event from the event queue, what kind of event is extracted can be figured out. Therefore, an existence checking process is executed when an event related to the keep-alive is extracted, and the event related to the keep-alive is abandoned. In this way, the existence can be checked without imposing a burden on the threads to be monitored. Thus, whether the process of a thread is performed while the thread returns the resources of the CPU to the OS, the resources of the CPU being allocated to the thread, can be determined by periodically including a specific message at the top of a delivery event of the thread as a delivery control target in the event delivery control and then determining whether the message has become a delivery target for the monitor threads 1 to 3 as a result of the delivery control. The CPU of the main control unit 31 executes an event delivery control thread and stores an event of keep-alive in the first event queue (not shown) of the monitor threads (for example, monitor threads 1 to 3) every preset predetermined time (for example, five seconds or ten seconds). At this point, the event of keep-alive is stored in order of, for example, monitor thread 1→monitor thread 2→monitor thread 3. The event may be stored in the monitor threads 1, 2, and 3 at the same time or substantially at the same time.

In step S1, the CPU of the main control unit 31 executes the event delivery control thread, determines whether there is a monitor thread without a response to the keep-alive (response to the keep-alive operation) in the monitor threads (for example, monitor threads 1 to 3) before a certain time (for example, five seconds or ten seconds) has passed after the storage of the event of the keep-alive (event related to the keep-alive), and waits until it is determined that there is a monitor thread without a response to the keep-alive.

For example, as described, if the user quickly and consecutively presses key inputs for a long time, the thread H cannot operate due to the priority of threads. The fifth process is not executed although events of the threads D to F are performed. However, the notification process of the sounding request from the thread F to the thread E is not executed. Therefore, the threads D to F in the group 2 occupy the resources of the CPU of the main control unit 31, and the monitor thread 2 cannot operate. As a result, there is no response to the keep-alive from the monitor thread 2, and it is determined that there is a monitor thread (monitor thread 2) without a response to the keep-alive in the monitor threads (for example, monitor threads 1 to 3).

If it is determined in step S1 that there is no monitor thread without a response to the keep-alive in the monitor threads (for example, monitor threads 1 to 3), the process returns to step S1, and the processes after step S1 are repeated. Thus, the CPU of the main control unit 31 again executes the event delivery control thread and stores the event of the keep-alive in the first event queue of the monitor threads (for example, monitor threads 1 to 3) every preset predetermined time (for example, five seconds or ten seconds).

If it is determined in step S1 that there is a monitor thread without a response to the keep-alive in the monitor threads (for example, monitor threads 1 to 3), the CPU of the main control unit 31 executes the event delivery control thread in step S2 and terminates the delivery of events to the next higher (the previous) group of the group monitored by the monitor thread without a response to the keep-alive.

For example, as described, if the threads D to F in the group 2 occupy the resources of the CPU of the main control unit 31 and the monitor thread 2 cannot operate, the delivery of events to the group 1, or the next higher (the previous) group of the group 2 monitored by the monitor thread 2 without a response to the keep-alive, is terminated.

In this way, when the event delivery control target thread inhibits the process of the event delivery control non-target threads, the inhibited situation can be resolved.

In step S3, the CPU of the main control unit 31 executes the event delivery control thread, and after the delivery of events to the next higher (the previous) group of the group monitored by the monitor thread without a response to the keep-alive is terminated, determines whether a response to the keep-alive arrives (recovers) from the monitor thread without a response to the keep-alive. It is preferable that the determination is made after a predetermined time from the termination of the delivery of events to the next higher group of the group monitored by the monitor thread, or after a predetermined time from the storage of the events of the keep-alive.

For example, as described, if the threads D to F in the group 2 occupy the resources of the CPU of the main control unit 31 and the monitor thread 2 cannot operate, whether a response to the keep-alive arrives (recovers) from the monitor thread 2 without a response to the keep-alive after the termination of the delivery of events to the group 1, or the next higher (the previous) group of the group 2 monitored by the monitor thread 2 without a response to the keep-alive, is determined.

If it is determined in step S3 that a response to the keep-alive arrives from the monitor thread without a response to the keep-alive, the CPU of the main control unit 31 recognizes in step S4 that an improvement is made so that the thread operation in the group monitored by the monitor thread without a response to the keep-alive is performed while the thread returns the resources of the CPU to the OS, the resources of the CPU being allocated to the thread, and that the operation of the monitor thread without a response to the keep-alive is improved. The CPU of the main control unit 31 then removes the termination of the delivery of events to the next higher (the previous) group of the group monitored by the monitor thread without a response to the keep-alive.

For example, when the delivery of events to the group 1, or the next higher (the previous) group of the group 2 monitored by the monitor thread 2 without a response to the keep-alive, is terminated, if it is determined that a response to the keep-alive arrives from the monitor thread 2 without a response to the keep-alive, the termination of the delivery of events to the group 1 is removed.

If it is determined in step S3 that a response to the keep-alive does not arrive yet from the monitor thread without a response to the keep-alive, the CPU of the main control unit 31, in step S5, executes the event delivery control thread and terminates the delivery of events to the group monitored by the monitor thread without a response to the keep-alive.

For example, as described, if it is determined that the threads D to F in the group 2 occupy the resources of the CPU of the main control unit 31 and the monitor thread 2 cannot operate, and that a response to the keep-alive does not arrive yet from the monitor thread 2 although the delivery of events to the group 1 is terminated, the delivery of events to the group 2 monitored by the monitor thread 2 is terminated.

In this way, the processes of the events already delivered to the threads D to F are executed, the operation of the thread H suspended due to the priority of threads is started, and the sounding process of key touch sound, or the fourth process, is executed.

However, if the processing time of the suspended operation of the thread H is longer than a predetermined monitoring time by the event delivery control thread, the monitor thread that monitors thread operations in the group 3 cannot operate this time. Thus, whether there is a monitor thread without a response to the keep-alive is determined again.

In step S6, the CPU of the main control unit 31 executes the event delivery control thread and determines whether there is a monitor thread without a response to the keep-alive in the monitor threads (for example, monitor threads 1 to 3) before a predetermine time (for example, five seconds or ten seconds) has passed from the storage of the events of keep-alive.

For example, if the processing time of the suspended operation of the thread H is longer than a predetermined monitoring time by the event delivery control thread, the monitor thread 3 that monitors the thread operations in the group 3 cannot operate this time, and the monitor thread 3 cannot operate. Therefore, the monitor thread 3 does not respond to the keep-alive, and it is determined that there is a monitor thread without a response to the keep-alive in the monitor threads (for example, monitor threads 1 to 3).

On the other hand, for example, if the processing time of the suspended operation of the thread H is shorter than the predetermined monitoring time by the event delivery control thread, the monitor thread 3 that monitors the thread operations in the group 3 can operate after the process of the suspended operation of the thread H. Therefore, the monitor thread 3 responds to the keep-alive and determines that there is no monitor thread without a response to the keep-alive in the monitor threads (for example, monitor threads 1 to 3).

If it is determined in step S6 that there is no monitor thread without a response to the keep-alive, the process returns to step S1, and the processes after step S1 are repeated.

In this way, the congestion on the system of the application program can be resolved in the same way even if a similar situation occurs again.

On the other hand, if it is determined in step S6 that there is a monitor thread without a response to the keep-alive, the process returns to step S5. In step S5, the CPU of the main control unit 31 executes the event delivery control thread to terminate the delivery of events to the group monitored by the monitor thread without a response to the keep-alive.

Subsequently, the processes after step S6 are repeated, and when all monitor threads arranged in advance (for example, monitor threads 1 to 3) can operate, the events are delivered to all threads as necessary. In other words, the same processes are sequentially repeated until the operations of the monitor thread 3 that monitors the group with lowest priority (group 3 in the case of FIG. 5) can be confirmed. When the operations of the monitor thread 3 that monitors the group with lowest priority are confirmed, the events are delivered to all threads as necessary.

In the embodiment of the present invention, a plurality of threads are roughly grouped into three groups (for example, groups 1 to 3) to execute the event delivery control process to simplify the explanation. However, the arrangement is not limited to this, and the threads can be grouped into two or more than four groups. Furthermore, the event delivery control nun-target threads in one group may be handled as one thread.

In the embodiment of the present invention, monitor threads (for example, monitor threads 1 to 3) that are threads for monitoring can be arranged below the threads with lowest priority of the groups, and the arranged monitor threads (for example, monitor threads 1 to 3) can be used to monitor whether the thread operations are performed in each group while the threads return the resources of the CPU to the OS in each group, the resources of the CPU being allocated to the threads. Whether there is a monitor thread without a response to the keep-alive in the monitor threads (for example, monitor threads 1 to 3) before a predetermined time (for example, five seconds or ten seconds) has passed from the storage of the events of keep-alive can be determined, and if it is determined that there is a monitor thread without a response to the keep-alive, the delivery of events to the next higher (the previous) group of the group monitored by the monitor thread without a response to the keep-alive can be terminated.

After the delivery of events to the next higher (the previous) group of the group monitored by the monitor thread without a response to the keep-alive is terminated, whether a response to the keep-alive arrives (recovers) from the monitor thread without a response to the keep-alive is determined. After the delivery of events to the group is terminated, if it is determined that a response to the keep-alive arrives (recovers) from the monitor thread without a response to the keep-alive, the termination of the delivery of events to the group is removed. On the other hand, after the delivery of events to the group is terminated, if it is determined that a response to the keep-alive does not arrive (recover) from the monitor thread without a response to the keep-alive, the delivery of events to the group monitored by the monitor thread without a response to the keep-alive (without recovery) can be terminated.

Furthermore, after the delivery of events to the group monitored by the monitor thread without a response to the keep-alive is terminated, whether there is a monitor thread without a response to the keep-alive in the monitor threads (for example, monitor threads 1 to 3) before a predetermined time (for example, five seconds to ten seconds) has passed from the storage of the events of keep-alive is determined repeatedly again. If it is determined that there is a monitor thread without a response to the keep-alive, the delivery of events to the group monitored by the monitor thread without a response to the keep-alive can be terminated. In this way, the delivery of events to the threads with high priority can be terminated, and the processes can be passed to lower groups. Therefore, an application program group established on an OS not equipped with the round-robin function or the TSS control function can be efficiently controlled.

Furthermore, the overhead during switching of tasks can be reduced, and the congestion on the system of an application program can be efficiently determined.

As a result, processes can be implemented based on a flexible priority order of threads grouped in advance, and grouping of threads including event delivery control target threads and event delivery control non-target threads can be devised to establish a flexible system of an application program group. The system can be used to establish a broad system including existing application programs.

By the way, in the event delivery control process described with reference to the flow chart of FIG. 6, if it is determined that there is a monitor thread (for example, monitor thread 2) without a response to the keep-alive, the delivery of events to the next higher (the previous) group (group 1) of the group monitored by the monitor thread 2 without a response to the keep-alive is terminated to control the event delivery to the thread, which is an event delivery control target, to thereby sequentially complete the operations of inoperable threads in descending order of priority. Thus, a certain time is required to resolve the inoperable threads, and the operations of other threads, in which some real-time nature needs to be secured, may be influenced. Especially, since event delivery control non-target threads also exist, some time lag occurs in resolving the inoperable threads even if the event delivery to the event delivery control target threads is terminated. Thus, regardless of whether a certain thread is an event delivery control target thread or a control non-target thread, in order to allocate the resources of the CPU of the main control unit 31 to other threads while the thread is currently activated, the thread is mandatorily arranged in the priority order (priority) below the monitor thread 1, and the priority order of other threads, to which the resources of the CPU are preferably allocated, are relatively raised.

Specifically, in the present invention, an OS is simulated in which the priority order is set for the threads in accordance with the real-time nature required for the threads generated by the application programs, and the threads are sequentially operated in descending order of the priority order. For example, in the case of FIG. 7(A), there is an event delivery control thread in the thread with the highest priority order, and then the threads A to C included in the group 1 exist as threads in priority order 2 to 4. The monitor thread 1 that monitors whether the threads in the group 1 are operated is arranged as a thread with priority order 5.

In this case, for example, if the thread A with priority order 2 in the group 1 is operated for, for example, one second by an event delivered from the event delivery control thread, and the thread B with priority order 3 is operated for, for example, 0.5 second in each event, the resources of the CPU of the main control unit 31 may be occupied for a long time by the operation of the thread A even if the thread B attempts to operate according to the event, and the operation of the thread B is obstructed. As a result, the operation of the thread B is not performed, and a response corresponding to the keep-alive operation from the monitor thread 1 is not sent to the event delivery control thread.

Figures 7A, 7B:
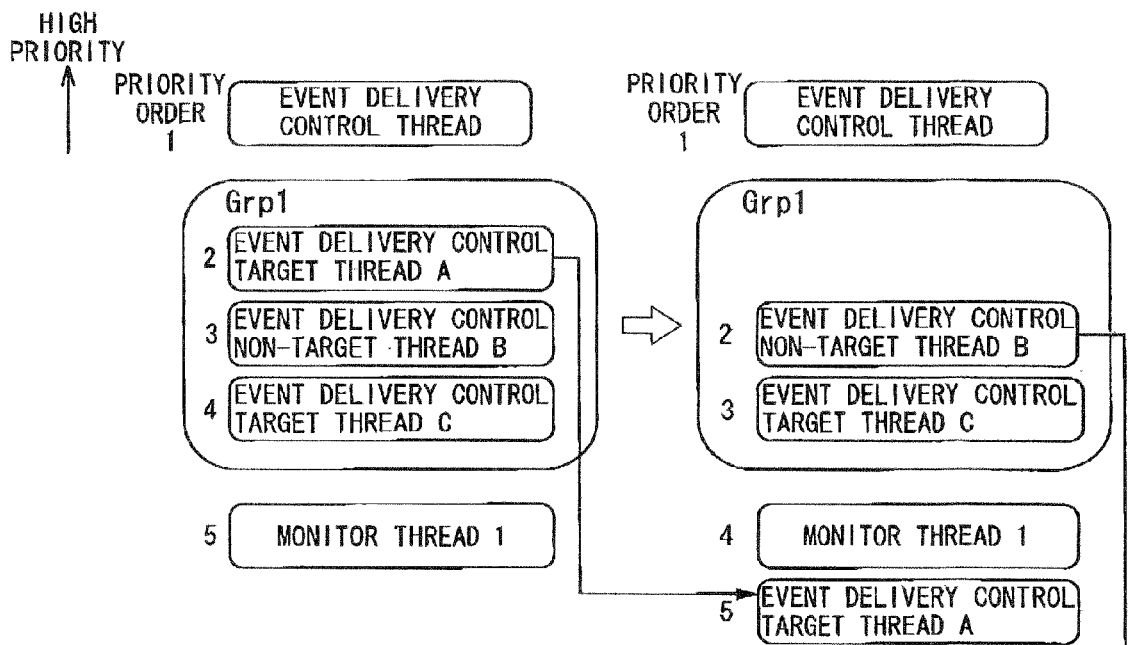
FIG. 7 is an explanatory view for explaining a concept of a change in the priority of the threads.

In such a case, as shown in FIG. 7(B), the thread A is mandatorily arranged at the priority order below the monitor thread 1 at a certain time interval (for example, 0.1 second interval) although the thread A is currently operating. In this way, the priority order of event delivery control thread, thread A, thread B, thread C, and monitor thread 1 is changed to the priority order of event delivery control thread, thread B, thread C, monitor thread 1, and thread A. Thus, the priority order of the thread A is changed from second to fifth, and the priority order of the thread B, the thread C, and the monitor thread 1 are changed to second, third, and fourth, respectively. As a result, the operation of the thread B inhibited by the operation of the thread A is started, and a response corresponding to the keep-alive operation from the monitor thread 1 is sent to the event delivery control thread. Therefore, the operations of the threads with high priority can be controlled at suitable timing. Hereinafter, a thread priority changing process using the method will be described.

Figure 7C:
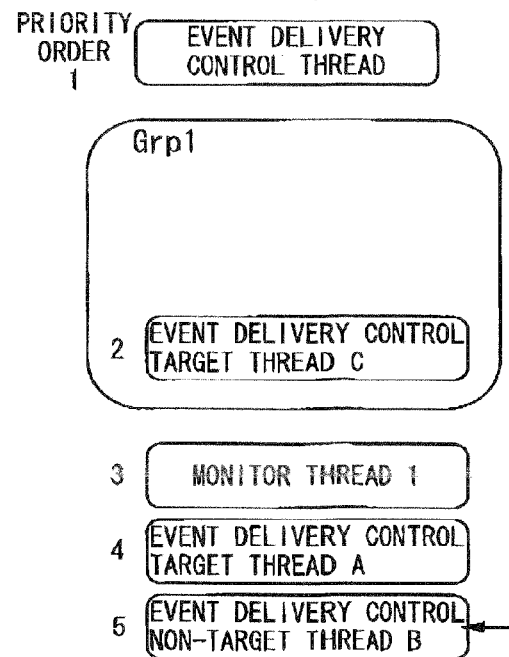

If the operation of the thread B occupies the resources of the CPU of the main control unit 31 for a long time, the arrangement of the thread A below the monitor thread 1 is not sufficient, and as shown in FIG. 7(C), the thread B as an event delivery control non-target is also arranged below the monitor thread 1. Thus, the priority order of event delivery control thread, thread A, thread B, thread C, and monitor thread 1 is changed to the priority order of event delivery control thread, thread C, monitor thread 1, thread A, and thread B.

The thread priority changing process of the cellular phone 1 of FIG. 3 will be described with reference to a flow chart of FIG. 8.

In S11, the CPU of the main control unit 31 executes the event delivery control thread, determines whether there is a monitor thread without a response to the keep-alive (response to the keep-alive operation) in the monitor threads (for example, monitor threads 1 to 3) before a certain time (for example, five seconds or ten seconds) has passed after the storage of the event of the keep-alive (event related to the keep-alive), and waits until it is determined that there is a monitor thread without a response to the keep-alive.

For example, if the thread A with priority order 2 in the group 1 is operated for, for example, one second by an event delivered from the event delivery control thread, and the thread B with priority order 3 is operated for, for example, 0.5 second in each event, the resources of the CPU of the main control unit 31 may be occupied for a long time by the operation of the thread A even if the thread B attempts to operate according to the event, and the operation of the thread B is obstructed. If the operation of the thread B occupies the resources of the CPU of the main control unit 31 for a long time, the operation of the thread C is obstructed. Therefore, the monitor thread 1 does not respond to the keep-alive, and it is determined that there is a monitor thread (monitor thread 2) without a response to the keep-alive in the monitor threads (for example, monitor threads 1 to 3).

If it is determined in step S1 that there is no monitor thread without a response to the keep-alive in the monitor threads (for example, monitor threads 1 to 3), the process returns to step S11, and the processes after step S1 are repeated. Thus, the main control unit 31 again executes the event delivery control thread and stores the event of keep-alive in the first event queue of the monitor threads (for example, monitor threads 1 to 3) every preset predetermined time (for example, five seconds or ten seconds).

If it is determined in step S11 that there is a monitor thread without a response to the keep-alive in the monitor threads (for example, monitor threads 1 to 3), the CPU of the main control unit 31 executes the event delivery control thread in step S12 and changes the priority of the threads included in the group monitored by the monitor thread without a response to the keep-alive.

For example, as shown in FIG. 7(B), the thread A is mandatorily arranged at the priority order below the monitor thread 1 at a certain time interval (for example, 0.1 second interval) even if the thread A is currently operating. In this way, the priority order of event delivery control thread, thread A, thread B, thread C, and monitor thread 1 is changed to the priority order of event delivery control thread, thread B, thread C, monitor thread 1, and thread A. Thus, the priority order of the thread A is changed from second to fifth, and the priority order of the thread B, the thread C, and the monitor thread 1 are changed to second, third, and fourth, respectively.

In this way, if the operation of the thread A inhibits the operation of the thread B, the inhibited operation of the thread B is started, and a response corresponding to the keep-alive operation from the monitor thread 1 is sent to the event delivery control thread.

In step S13, the CPU of the main control unit 31 executes the event deliver control thread, and after the priority of the threads included in the group monitored by the monitor thread without a response to the keep-alive is changed, determines whether a response to the keep-alive arrives (recovers) from the monitor thread without a response to the keep-alive.

If it is determined in step S13 that a response to the keep-alive arrives from the monitor thread without a response to the keep-alive, the CPU of the main control unit 31 executes the event delivery control thread in step S14 and recognizes that an improvement is made so that the thread operation in the group monitored by the monitor thread without a response to the keep-alive can be performed and that the operation of the monitor thread without a response to the keep-alive is improved. The CPU of the main control unit 31 then restores the priority of the threads included in the group monitored by the monitor thread without a response to the keep-alive (thus, restores the priority of the threads in which the priority is changed by the process of step S12).

For example, in the case of FIG. 7(B), since the priority order of the thread A is changed from second to fifth, and the priority order of the thread B, the thread C, and the monitor thread 1 are changed to second, third, and fourth, respectively, the original state shown in FIG. 7(A) is restored. Thus, the priority order (priority) of event delivery control thread, thread A, thread B, thread C, and monitor thread 1 is restored. The process then returns to step S11.

On the other hand, if it is determined in step S13 that a response to the keep-alive does not arrive from the monitor thread without a response to the keep-alive (thus, when the operation by the thread B occupies the resources of the CPU of the main control unit 31 for a long time, and the operation by the thread C is inhibited), the process returns to step S12, and a changing process of the priority of threads is executed at a certain time interval (for example, at 0.1 second interval) in step S12. Thus, if the operation by the thread B occupies the resources of the CPU of the main control unit 31 for a long time, the operation of the thread C is inhibited, and it is not sufficient to arrange the thread A below the monitor thread 1. Therefore, as shown in FIG. 7(C), after a certain time (for example, 0.1 second) from the arrangement of the thread A below the monitor thread 1, the thread B as an event delivery control non-target is also mandatorily arranged below the monitor thread 1. The priority order of event delivery control thread, thread A, thread B, thread C, and monitor thread 1 is changed to the priority order of event delivery control thread, thread C, monitor thread 1, thread A, and thread B.

Subsequently, the process proceeds to step S14, and whether a response to the keep-alive arrives in step S13 is determined. If it is determined that a response to the keep-alive arrives from the monitor thread without a response to the keep-alive in step S13, the CPU of the main control unit 31 restores the priority of the threads included in the group monitored by the monitor thread without a response to the keep-alive in step S14. Thus, in the example of FIG. 7(C), since the priority order (priority) is changed to event delivery control thread, thread C, monitor thread 1, thread A, and thread 13, the original state shown in FIG. 7(A) is restored. The process then returns to step S11, and the processes after step S11 are repeated.

In this way, the operations of the threads with high priority are temporarily inhibited, and the processes can be passed to the threads with low priority. Therefore, an application program group established on an OS not equipped with the round-robin function or the TSS control function can be efficiently controlled without using the round-robin function or the TSS control function. Furthermore, the overhead during switching of tasks can be reduced, and the congestion on the system of an application program can be efficiently determined.

Figure 9A:
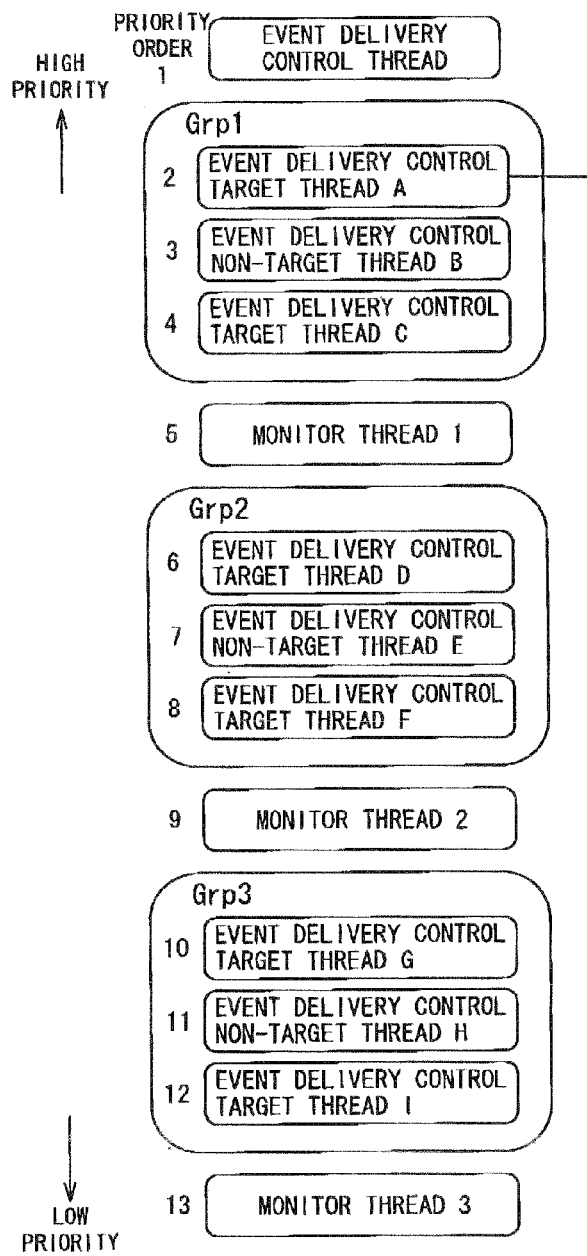
FIG. 9 is an explanatory view for explaining a concept of a change in the priority of the threads.
Figure 9B:
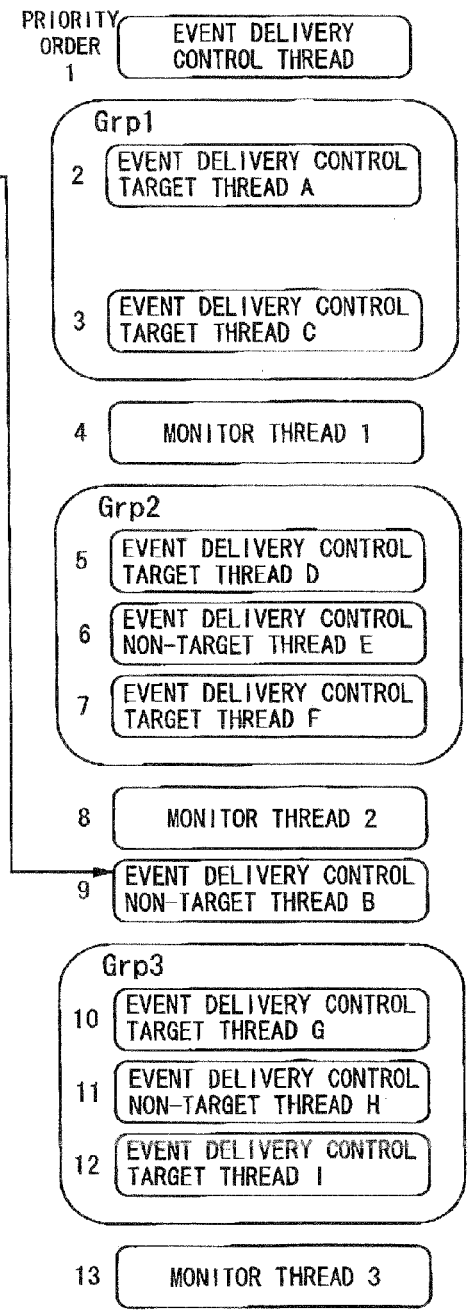

If a large amount of drawing processes is performed at once when the thread B as an event delivery control non-target is a UI (user interface) type thread, the operation of the thread B occupies the resources of the CPU of the main control unit 31. In this case, it is assumed, for example, that a response corresponding to the keep-alive operation from the monitor thread 2 is not sent to the event delivery control thread because the operation by the thread D of the group 2 needs to be performed every 0.5 second. In such a case, since the operation of the thread B occupies the resources of the CPU of the main control unit 31, it is estimated that the operation of the thread D is inhibited. For example, as shown in FIGS. 9(A) and 9(B), the priority of the thread B is lowered across the groups to the location below the monitor thread 2 that monitors the operation of the group 2. In this way, the operations of the threads with high priority are temporarily controlled, and the process can be suitably and certainly passed to the threads with low priority.

Figure 8:
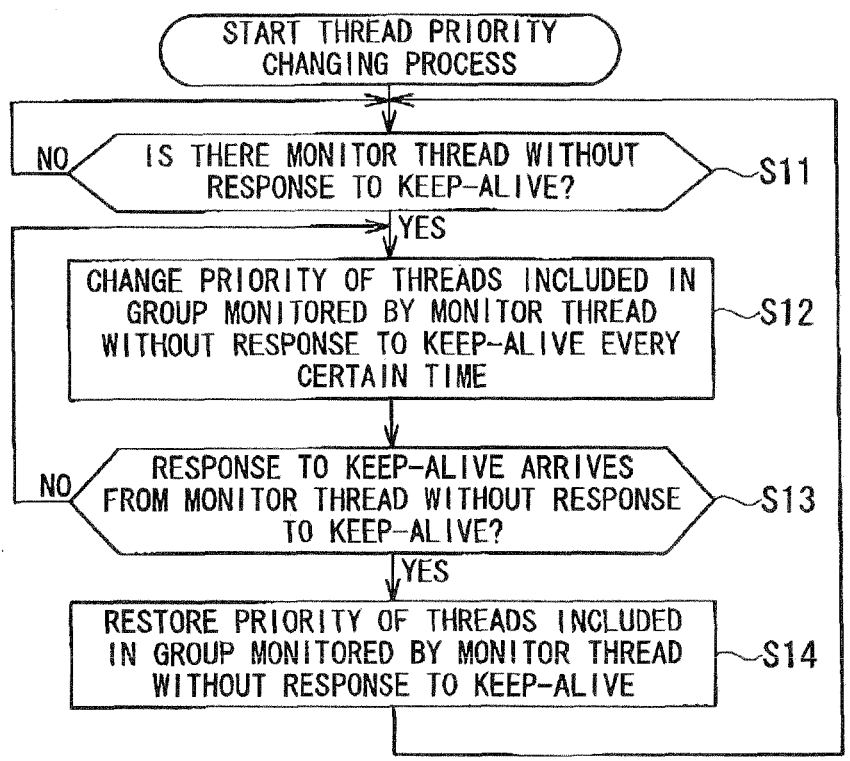
FIG. 8 is a flow chart for explaining a thread priority changing process in the cellular phone of FIG. 3.

In the thread priority changing process of FIG. 8, when a response to the keep-alive arrives from the monitor thread without a response to the keep-alive, the priority of the thread occupying the resources of the CPU of the main control unit 31 is restored, and the temporary control of the operation of the thread is removed. However, the arrangement is not limited to this. A timer may be used, and after n time (ms) has passed from the operation control of the thread by changing the priority of the thread, the control of the operation may be removed.

The following case can be simulated as a case using the method. More specifically, for example, when the thread B as an event delivery control non-target is a UI (user interface) type thread, if a large amount of drawing processes is executed at once, the operation of the thread B occupies the resources of the CPU of the main control unit 31. In this case, the thread B cannot accept a new operation key by the user (for example, accepting canceling of a drawing process) if the priority of the thread B is kept below the monitor thread 1 because the operation of the thread C is inhibited. In such a case, the thread B, in which the operation is controlled, temporarily restored to the original priority, and the control of the operation is removed after n time (ms) has passed from the operation control of the thread B. As a result, the thread B can accept a new operation key by the user. Subsequently, if the operation of the thread B still occupies the resources of the CPU of the main control unit 31, the operation of the thread B is controlled again after a certain time (for example, 0.1 second) from the control of the operation of the thread B by the execution of the event delivery control thread. Hereinafter, a thread priority changing process using the method will be described.

Figure 10:
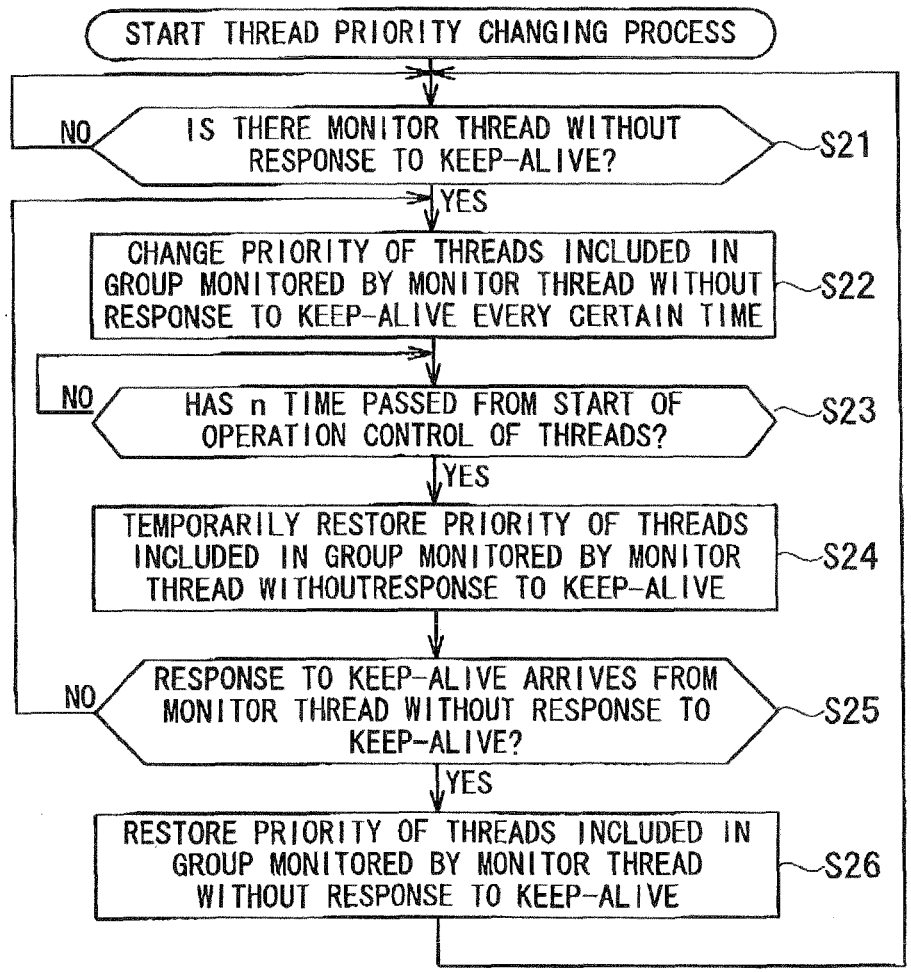
FIG. 10 is a flow chart for explaining another thread priority changing process in the cellular phone of FIG. 3.

Another thread priority changing process in the cellular phone 1 of FIG. 3 will be described with reference to a flow chart of FIG. 10. The processes of steps S21, S22, S25, and S26 of FIG. 10 are basically the same as the processes of steps S11 to S14 of FIG. 8, and the repetition of the description will be omitted.

In this case, it is assumed that, in step S22, the CPU of the main control unit 31 executes the event delivery control thread and changes the priority of the thread B, which is included in the group monitored by the monitor thread without a response to the keep-alive, below the monitor thread 1.

In step S23, the CPU of the main control unit 31 executes the event delivery control thread, uses a timer, determines whether n time (ms) has passed after the operation control of the thread B, and waits until determining that n time (ms) has passed after the operation control of the thread B. If it is determined in step S23 that n time (ms) has passed after the operation control of the thread B, the CPU of the main control unit 31 executes the event delivery control thread in step S24, temporarily restores the thread B, in which the operation is controlled, to the original priority, and removes the control of the operation of the thread B. In this way, the operations of the threads with high priority can be temporarily controlled to pass the processes to the threads with low priority, and the thread B, in which the priority is changed, can accept a new operation key by the user.

Figure 11:
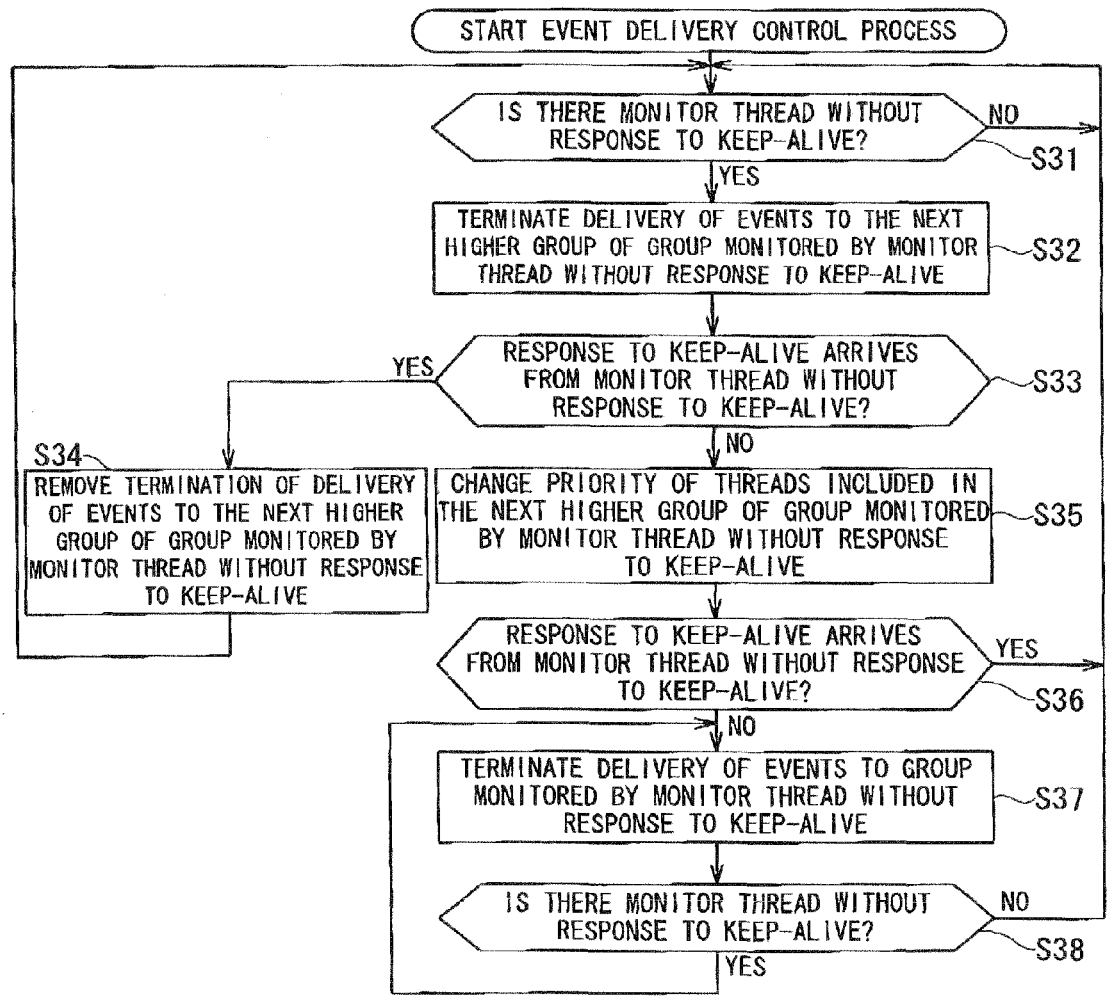
FIG. 11 is a flow chart for explaining another event delivery control process in the cellular phone of FIG. 3.

The thread priority changing process described using the flow charts of FIGS. 8 to 10 may be combined as necessary with the event delivery control process described with reference to the flow chart of FIG. 6. An example of the process in this case is illustrated in FIG. 11. Processes of steps S31 to S34, and S37 to S38 of FIG. 11 are basically the same as the processes of steps S1 to S6 of FIG. 6.

As shown in FIG. 11, for example, the UI type thread B in the group 1 occupies the resources of the CPU of the main control unit 31, and as a result, the monitor thread 2 cannot operate. If a response to the keep-alive does not arrive yet from the monitor thread 2 although the delivery of events to the group 1 is terminated, the CPU of the main control unit 31 executes the event delivery control thread in step S35 and changes the priority of the thread B included in the group 1 as the next higher group of the group 2 monitored by the monitor thread 2 without a response to the keep-alive to arrange the thread B below the monitor thread 2. In this way, the threads D to F of the group 2 can sequentially operate. If there is no response to the keep-alive from the monitor thread 2 after the priority of the thread 13 is changed, the delivery of events to the group 2 is also terminated in step S37. In this way, the delivery of events to the threads with high priority can be terminated, and the processes can be suitably passed to the lower groups. Therefore, an application program group established on an OS not equipped with the round-robin function or the TSS control function can be efficiently controlled. As soon as the response to the keep-alive from the monitor thread 2 is recovered, the event delivery control thread is executed to restore the changed priority of threads.

Other than the cellular phone 1, the present invention can be applied to a PDA (Personal Digital Assistant), a personal computer, a portable gaming machine, a portable music reproducer, a portable video reproducer, and other information processing apparatuses.

Although software can execute the series of processes described in the embodiment of the present invention, hardware can also execute the processes.

Furthermore, although an example, in which the processes of steps of the flow charts are executed in chronological order in the order of description, has been illustrated in the embodiment of the present invention, the processes do not have to be executed in chronological order, and processes executed concurrently or individually are also included.

The invention claimed is:

1. A processor for an information processing apparatus, the processor comprising:
   a monitoring unit configured to execute a keep-alive operation on a plurality of monitor threads to monitor a plurality of groups of threads respectively when an event delivery control thread is executed in parallel with execution of the keep-alive operation, to receive a response to the keep-alive operation from each of the plurality of monitor threads, the plurality of monitor threads and the plurality of groups of threads having mutually different priority levels, each of the plurality of monitor threads configured to monitor threads included in a corresponding one of the plurality of groups for the monitor thread;
   a first determining unit configured to determine whether there is a no-response monitor thread which does not respond to the keep-alive operation, among the plurality of monitor threads, based on respective responses from the plurality of monitor threads;
   a first terminating unit configured to terminate delivery of events to a group of threads having a priority level next higher than a priority level of a group of threads monitored by the no-response monitor thread if the first determining unit determines that there is the no-response monitor thread;
   a second determining unit configured to determine, through the monitoring by the monitoring unit after the termination of the delivery of events by the first terminating unit, whether operations of the threads of the group corresponding to the no-response monitor thread are recovered; and
   a second terminating unit configured to terminate the delivery of events to the threads of the group corresponding to the no-response monitor thread if the second determining unit determines that the operations of the threads of the group are not recovered,
   wherein the plurality of monitor threads is provided to monitor operations of the threads included in the plurality of groups respectively without adding any process to the threads included in the plurality of groups,
   wherein the event delivery control thread is configured to monitor only the plurality of monitor threads without monitoring the plurality of groups of threads, and
   wherein each of the plurality of monitor threads is configured to return a response to keep-alive operation to the event delivery control thread.

2. The processor according to claim 1, further comprising a removing unit configured to remove the termination of the delivery of events by the first terminating unit if the second determining unit determines that the operations of the threads of the group are recovered.

3. The processor according to claim 1,
   wherein the first determining unit is configured to determine, for a period of a predetermined time after the termination of the delivery of events by the second terminating unit, whether there is the no-response monitor thread which does not respond to the keep-alive operation, among the plurality of monitor threads, and
   wherein the second terminating unit is configured to continue the termination of the delivery of events to the threads of the group corresponding to the no-response monitor thread if the first determining unit determines that there is the no-response monitor thread.

4. The processor according to claim 1, wherein
   each of the groups includes at least an event delivery control target thread and an event delivery control non-target thread.

5. The processor according to claim 1, wherein
   an event related to keep-alive is stored at the top of an event queue of the monitor threads during the keep-alive operation.

6. The processor according to claim 1, wherein the first terminating unit is configured to repeat the termination of the delivery of events until the first determining unit determines that all the responses are received from the plurality of monitor threads and the no-response monitor thread no longer exists, and after it is determined that all the responses are received from the plurality of monitor threads and the no-response monitor thread no longer exists, the termination of the delivery of events by the first terminating unit is removed.

7. A processor for an information processing apparatus, the processor comprising:
   a monitoring unit configured to execute a keep-alive operation on a plurality of monitor threads to monitor a plurality of groups of threads respectively when an event delivery control thread is executed in parallel with execution of the keep-alive operation, to receive a response to the keep-alive operation from each of the plurality of the monitor threads, the plurality of monitor threads and the plurality of groups of threads having mutually different priority levels, each of the plurality of monitor threads configured to monitor threads configured to monitor threads included in a corresponding one of the plurality of groups for the monitor thread;

a first determining unit configured to determine whether there is a no-response monitor thread which does not respond to the keep-alive operation, among the plurality of monitor threads, based on respective responses from the plurality of monitor threads; and a priority changing unit configured to change a priority level of at least one of threads included in a group of threads having a priority level next higher than a priority level of a group of threads monitored by the no-response monitor thread if the first determining unit determines that there is the no-response monitor thread, wherein the plurality of monitor threads is provided to monitor operations of the threads included in the plurality of groups respectively without adding any process to the threads included in the plurality of groups, wherein the event delivery control thread is configured to monitor only the plurality of monitor threads without monitoring the plurality of groups of threads, wherein each of the plurality of monitor threads is configured to return a response to the keep-alive operation to the event delivery control thread; and wherein the priority changing unit is configured to change the priority level of the at least one of the threads included in the group of threads monitored by the no-response monitor thread or the priority level of the at least one of the threads included in the groups of threads monitored by the monitor threads having the higher priority levels to a priority level lower than the priority level of the no-response monitor thread.

8. The processor according to claim 7, further comprising a second determining unit configured to determine, through the monitoring by the monitoring unit after the changing of the priority level by the priority changing unit, whether the operations of the threads of the group corresponding to the no-response monitor thread are recovered, and the priority changing unit is configured to restore the changed priority level of the at least one of the threads to an original priority level if the second determining unit determines that the operations of the threads of the group are recovered.

9. The processor according to claim 7, wherein the priority changing unit is configured to restore the changed priority level of the at least one of the threads to an original priority level after a predetermined time has passed from a start of operation control of the at least one of the threads in which the priority level of the at least one of the threads in changed by the priority changing unit.

10. The processor according to claim 7, wherein the priority changing unit is configured to maintain the changed priority level of the at least one of the threads until the first determining unit determines that all the responses are received from the plurality of monitor threads and the no-response monitor thread no longer exists, and after it is determined that all the responses are received from the plurality of monitor threads and the no-response monitor thread no longer exists, the changed priority level of the at least one of the threads of the group is restored to an the original priority level.

* * * * *